(12) United States Patent
Chandler

(10) Patent No.: US 11,017,311 B2
(45) Date of Patent: May 25, 2021

(54) DATASET AUGMENTATION BASED ON OCCLUSION AND INPAINTING

(71) Applicant: Hewlett Packard Enterprise Development LP, Houston, TX (US)

(72) Inventor: Benjamin Orth Chandler, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1135 days.

(21) Appl. No.: 14/318,871

(22) Filed: Jun. 30, 2014

(65) Prior Publication Data

US 2015/0379422 A1 Dec. 31, 2015

(51) Int. Cl.
*G06F 15/18* (2006.01)
*G06N 20/00* (2019.01)

(52) U.S. Cl.
CPC .................................. *G06N 20/00* (2019.01)

(58) Field of Classification Search
None
See application file for complete search history.

(56) References Cited

U.S. PATENT DOCUMENTS

| | | | |
|---|---|---|---|
| 5,574,573 A * | 11/1996 | Ray | G07C 9/00071 348/77 |
| 6,807,286 B1 | 10/2004 | Krumm et al. | |
| 7,356,193 B2 | 4/2008 | Gallagher | |
| 7,587,061 B1 * | 9/2009 | Pacenti | G06K 9/00476 382/100 |
| 7,983,446 B2 | 7/2011 | Wiedermann et al. | |
| 8,326,598 B1 * | 12/2012 | Macherey | G06F 17/289 704/4 |
| 8,938,119 B1 * | 1/2015 | Han | G06K 9/4661 382/163 |
| 9,141,916 B1 * | 9/2015 | Corrado | G06N 3/0454 |
| 2002/0122596 A1 * | 9/2002 | Bradshaw | G06K 9/685 382/226 |
| 2002/0146178 A1 * | 10/2002 | Bolle | G06K 9/00067 382/254 |
| 2006/0122480 A1 * | 6/2006 | Luo | G06T 7/0012 600/407 |
| 2007/0258645 A1 * | 11/2007 | Gokturk | G06K 9/621 382/190 |

(Continued)

OTHER PUBLICATIONS

Ferrari, V et al, "Simulataneous Object Recognition and Segmentation from Single or Multiple Model Views", Jan. 21, 2006.

(Continued)

*Primary Examiner* — Luis A Sitiriche
(74) *Attorney, Agent, or Firm* — Hewlett Packard Enterprise Patent Department

(57) ABSTRACT

Augmenting a dataset in a machine learning classifier is disclosed. One example is a system including a training dataset with at least one training data, and a label preserving transformation including an occluder, and an inpainter. The occluder occludes a selected portion of the at least one training data. The inpainter inpaints the occluded portion of the at least one training data, where the inpainting is based on data from a portion different from the occluded portion. In one example, the augmented dataset is deployed to train a machine learning classifier.

20 Claims, 5 Drawing Sheets

(56) References Cited

U.S. PATENT DOCUMENTS

| | | | |
|---|---|---|---|
| 2007/0297650 A1* | 12/2007 | Rabinovich | G06K 9/00288 |
| | | | 382/118 |
| 2008/0278633 A1 | 11/2008 | Tsoupko-Sitnikov et al. | |
| 2008/0310759 A1* | 12/2008 | Liu | G06K 9/00241 |
| | | | 382/294 |
| 2010/0046849 A1* | 2/2010 | Wu | G06T 9/008 |
| | | | 382/253 |
| 2010/0322534 A1* | 12/2010 | Bolme | G06K 9/746 |
| | | | 382/278 |
| 2011/0221769 A1 | 9/2011 | Leung et al. | |
| 2012/0141045 A1* | 6/2012 | Bae | G06T 5/005 |
| | | | 382/275 |
| 2012/0170805 A1* | 7/2012 | Brown | G06K 9/00778 |
| | | | 382/103 |
| 2013/0148847 A1 | 6/2013 | Wang et al. | |
| 2014/0015855 A1* | 1/2014 | Denney | G06K 9/6218 |
| | | | 345/629 |
| 2014/0079297 A1* | 3/2014 | Tadayon | G06K 9/00 |
| | | | 382/118 |
| 2015/0110387 A1* | 4/2015 | Lienhart | G06F 17/30256 |
| | | | 382/159 |

OTHER PUBLICATIONS

Deng et al., ImageNet: A Large-Scale Hierarchical Image Database, Jun. 2009 (9 pages).
Hoiem et al., Diagnosing Error in Object Detectors, 2012 (14 pages).
Lecun et al., Learning Methods for Generic Object Recognition with Invariance to Pose and Lighting, IEEE, 2004 (8 pages).
Torralba et al., Unbiased Look at Dataset Bias, 2011 (8 pages).

* cited by examiner

DATASET AUGMENTATION BASED ON OCCLUSION AND INPAINTING

BACKGROUND

Supervised learning utilizes labeled training data to infer a function. Labeled training data generally refers to adding a tag to unlabeled data, where the tag may be meaningful for a particular classification analysis. Augmenting a labeled dataset is the process of applying a transformation function to each data in the dataset to produce additional data with the same label.

DETAILED DESCRIPTION

Figure 1:
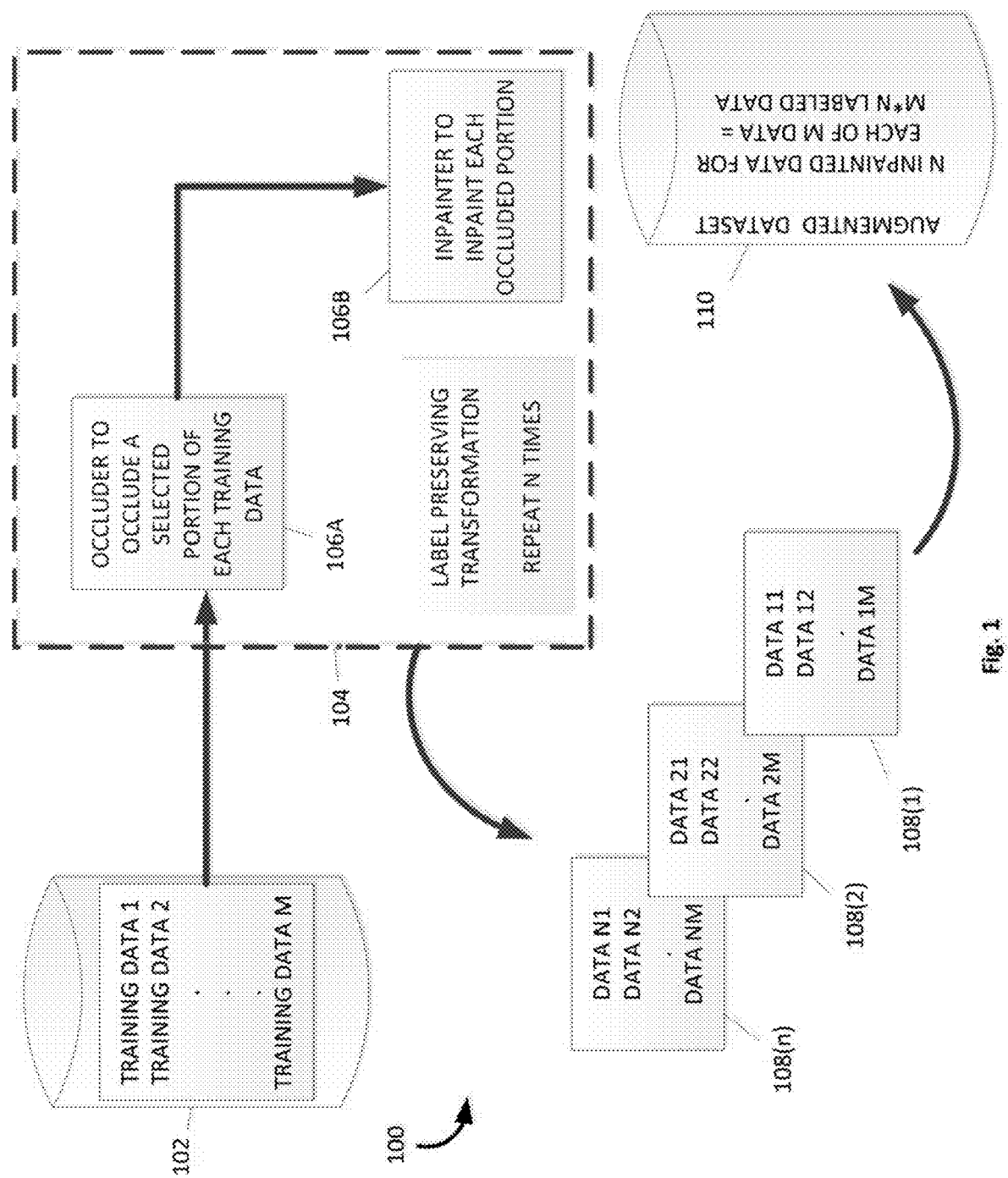
FIG. 1 is a functional block diagram illustrating one example of a system for dataset augmentation based on occlusion and inpainting.

Dataset augmentation based on occlusion and inpainting is disclosed. Supervised learning generally utilizes labeled training data to infer a function. Labeled training data refers to adding a tag to unlabeled data, where the tag may be meaningful for a particular classification analysis. Augmenting a labeled dataset is the process of applying a transformation function to each data in the dataset to produce additional data with the same label. For example, an augmenting technique may be applied to a training dataset with M number of training data to obtain a dataset with N*M number of training data, where N≥1. Training with an augmented dataset provides higher performance in situations where training data is not readily available.

A labeled dataset may be augmented by utilizing a label preserving transformation. A label preserving transformation generates new data from existing data, where the new data has the same label as the existing data. Reflections, linear shifts, and elastic distortions are three classes of label preserving transformations that may be generally applied to object classification analyses. These transformations build an invariance to an expected transformation in the data. For example, the digit four is still a four when shifted several pixels to the left. The Mixed National Institute of Standards and Technology ("MNIST") database is a publicly available database of handwritten digits that is generally utilized for training image processing systems.

As described in various examples herein, dataset augmentation based on occlusion and inpainting is disclosed. As described herein, a combination of occlusion and inpainting is a label preserving transformation that augments a dataset of labeled data. One example is a system including a training dataset with at least one training data, and a label preserving transformation including an occluder, and an inpainter. The occluder occludes a selected portion of the at least one training data. The inpainter inpaints the occluded portion of the at least one training data, where the inpainting is based on data from a portion different from the occluded portion. Accordingly, the dataset is augmented by adding, for the at least one training data, the transformed at least one training data to the dataset. In one example, the augmented dataset is deployed to train a machine learning classifier.

In one example described herein, the dataset may be a dataset of images, and the at least one training data is an image. The selected portion of the image is a plurality of pixels in the image. The occluder removes a randomly selected plurality of pixels, the inpainter inpaints the missing plurality of pixels by digitally inpainting the plurality of pixels based on information from the pixels that are remaining. As described herein, first occluding and then dis-occluding a dataset using inpainting is an effective technique for dataset augmentation.

In the following detailed description, reference is made to the accompanying drawings which form a part hereof, and in which is shown by way of illustration specific examples in: which the disclosure may be practiced. It is to be understood that other examples may be utilized, and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

FIG. 1 is a functional block diagram illustrating one example of a system 100 for dataset augmentation based on occlusion and inpainting. The system 100 receives a training dataset for machine learning, the dataset including at least one training data. An occluder occludes a selected portion of the at least one training data. An inpainter inpaints the occluded portion of the at least one training data, where the inpainting is based on data from a portion different from the occluded portion.

System 100 includes a dataset 102 with at least one training data, a label preserving transformation 104 comprising an occluder 106A and an inpainter 106B, transformed at least one training data 108(1), 108(2), ..., 108(n), and an augmented dataset 110.

Dataset 102 includes at least one training data for machine learning. Augmentation techniques are generally utilized in machine learning to increase the number of data in a training dataset, reduce over-fitting, and allow generalization. An augmented dataset is deployed to train a machine learning classifier. The trained classifier may be utilized to infer a label for unlabeled data. In one example, the machine learning classifier may be a deep learning classifier. Deep learning algorithms model high level abstractions in a dataset by utilizing architectures composed of a plurality of non-linear transformations. Deep learning classifiers may include, for example, deep neural networks, and convolutional deep neural networks ("ConvNet"). The specific network structure may be user-configurable.

The dataset 102 includes at least one training data. As illustrated in FIG. 1, the at least one training data may include M training data (e.g., Training Data 1, Training Data 2, ..., Training Data M). In one example, the dataset 102 is a dataset of images, and the at least one training data is an image, and the portion of the image is a plurality of pixels in the image.

System 100 includes a label preserving transformation 104 comprising an occluder 106A and an inpainter 106B. The occluder 106A occludes a selected portion of the at least one training data. In one example, the at least one training data may be an image, and occluding the selected portion may include adding an obstruction to the image. In one example, occluding the selected portion may include masking the obstruction. System 100 occludes the selected portion, and may, in one example, generate a metadata that includes the location and/or type of the occluded portion.

Figure 2:
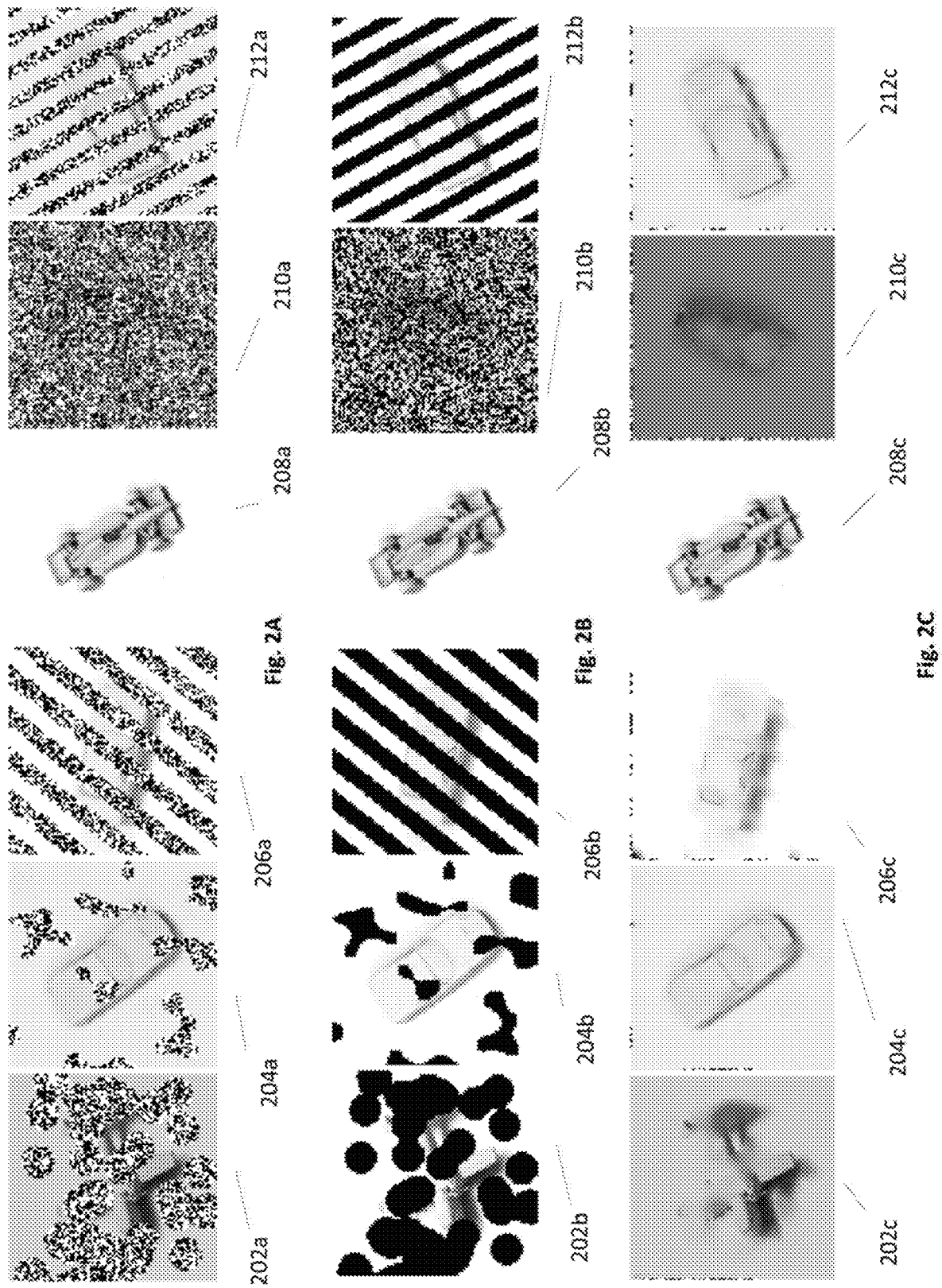
FIG. 2A illustrates example images from a classifier dataset.
FIG. 2B illustrates example images with masking applied to occluded regions.
FIG. 2C illustrates example images with inpainting applied to occluded portions.

FIG. 2A illustrates example images from a classifier dataset. The example images are from the Synthetic Object Recognition Benchmark with Occlusions ("SORBO") dataset. A first image 202a is illustrated with an occlusion type blob. A second image 204a is also illustrated with an occlusion type blob. A third image 206a is illustrated with an occlusion type bar. A fourth image 208a is illustrated with no occlusion. A fifth image 210a is illustrated with an occlusion type random. A sixth image 212a is illustrated with an occlusion type bar.

FIG. 2B illustrates example images with masking applied to occluded regions. As illustrated, images 202b, 204b, 206b, 208b, 210b, and 212b are images where masking has been applied to the respective occluded portions of the first image 202a, the second image 204a, the third image 206a, the fourth image 208a, the fifth image 210a, and the sixth image 212a. In each of the images, an occluded portion has been masked by setting the occluded portion to black.

In one example, the occluder 106A selects the portion of the at least one training data randomly. Randomness ensures that the occluder 106A selects distinct portions in each of N copies, thereby generating N distinct copies of the at least one training data.

System 100 includes an inpainter 106B to inpaint the occluded portion of the at least one training data, where the inpainting is based on data from a portion different from the occluded portion.

In one example, the dataset may be a dataset of images, and the at least one training data may be an image. The inpainter 106B may erase the occlusion and fill in the pixels in the occluded portion of the image based on information from the visible pixels (i.e., pixels that are not in the occluded portion). In one example, the inpainter 106B performs a fast digital inpainting process. In one example, an open source digital inpainting algorithm may be utilized, for example, an algorithm from the OpenCV library. This algorithm treats occluded pixels as damaged and attempts to fill them in using information from neighboring pixels. The result is an image with no visible occlusions, but varying amounts of distortion due to the missing information at the locations of the occlusions.

FIG. 2C illustrates example images with inpainting applied to occluded portions. As illustrated, images 202c, 204c, 206c, 208c, 210c, and 212c are images where inpainting has been applied to the respective occluded portions of the first image 202a, the second image 204a, the third image 206a, the fourth image 208a, the fifth image 210a, and the sixth image 212a. Inpainting infers a plausible value for the occluded pixels by using the remaining visible pixels.

In one example, the label preserving transformation 104 may be repeated N times on the at least one training data. This generates N transformed training data 108(1), 108(2), . . . , 108(n) for each of M training data, thereby producing M*N transformed training data. Accordingly, the dataset is augmented by adding, for the at least one training data, the transformed training data 108(1), 108(2), . . . , 108(n) to the dataset. In one example, the label of the transformed training data may be modified based on metadata from the occluder 106A and the inpainter 106B. Accordingly, an augmented dataset 110 is produced. System 100 therefore transforms the dataset 102 into an augmented dataset 110.

Figure 3:
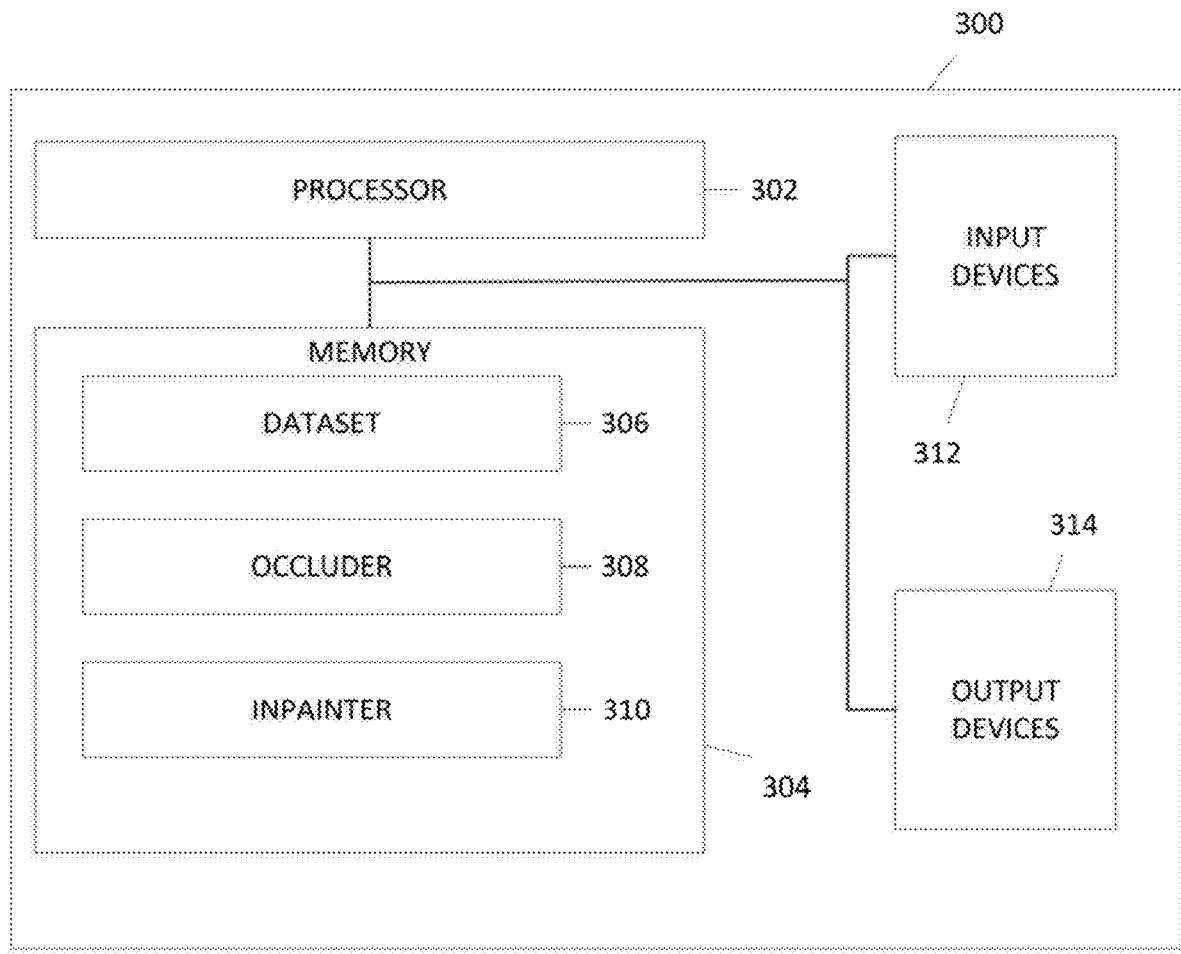
FIG. 3 is a block diagram illustrating one example of a processing system for implementing the system for dataset augmentation based on occlusion and inpainting.

FIG. 3 is a block diagram illustrating one example of a processing system 300 for implementing the system 100 for dataset augmentation based on occlusion and inpainting. Processing system 300 includes a processor 302, a memory 304, input devices 312, and output devices 314. Processor 302, memory 304, input devices 312, and output devices 314 are coupled to each other through communication link (e.g., a bus).

Processor 302 includes a Central Processing Unit (CPU) or another suitable processor that includes a graphics processor. In one example, memory 304 stores machine readable instructions executed by processor 302 for operating processing system 300. Memory 304 includes any suitable combination of volatile and/or non-volatile memory, such as combinations of Random Access Memory (RAM), Read Only Memory (ROM), flash memory, and/or other suitable memory.

Memory 304 stores a dataset 306 including at least one training data for processing by processing system 300. Memory 304 also stores instructions to be executed by processor 302 including instructions for an occluder 308, and an inpainter 310. In one example, occluder 308, and inpainter 310, include occluder 106A, and inpainter 106B, respectively, as previously described and illustrated with reference to FIG. 1.

In one example, processor 302 utilizes the dataset 306 including the at least one training data, and executes instructions of occluder 308 to occlude a selected portion of the at least one training data. Processor 302 also executes instructions of inpainter 310 to inpaint the occluded portion of the at least one training data, where the inpainting is based on data from a portion different from the occluded portion. In one example, dataset 306 is a dataset of images, and the at least one training data is an image, and the selected portion of the image is a plurality of pixels in the image. Processor 302 also executes instructions of occluder 308 to occlude randomly selected plurality of pixels. Randomness ensures that the occluder 308 selects distinct portions in each of N copies, thereby generating N distinct copies of the at least one training data. Processor 302 also executes instructions of inpainter 310 to inpaint the occluded plurality of pixels by digitally inpainting the plurality of pixels based on information from the pixels that are different from the occluded plurality of pixels. In one example, processor 302 may execute instructions of occluder 308 and inpainter 310 repeatedly N times on the at least one training data. This generates N transformed training data for each of M training data, thereby producing M*N transformed training data from dataset 306.

In one example, processor 302 executes instructions to augment the dataset by adding, for the at least one training data, the transformed at least one training data to the dataset. In one example, processor 302 executes instructions to augment the dataset by adding M*N transformed training data from M initial training data. In one example, processor 302 executes instructions to modify the label of the transformed at least one training data based on metadata from the occluder 308 and the inpainter 310. In one example, processor 302 executes instructions of deployer to deploy the augmented dataset to train a machine learning classifier. In one example, processor 302 executes instructions to infer, based on the trained machine learning classifier, a label for unlabeled data. In one example, the machine learning classifier is a deep learning classifier.

Input devices 312 include a keyboard, mouse, data ports, and/or other suitable devices for inputting information into processing system 300. In one example, input devices 312 are used to input feedback from users for selecting a dataset 306, and/or receive an image for processing. Output devices 314 include a monitor, speakers, data ports, and/or other suitable devices for outputting information from processing system 300. In one example, output devices 314 are used to output a processed image based on a trained machine learning classifier. In one example, another image is received via input devices 312. Processor 302 executes instructions of occluder 308, based on the trained machine learning classifier, to identify at least one occlusion in the another image. Processor 302 executes instructions of inpainter 310, based on the trained machine learning classifier, to inpaint the at least one occlusion, and provides the output data via output devices 314.

Figure 4:
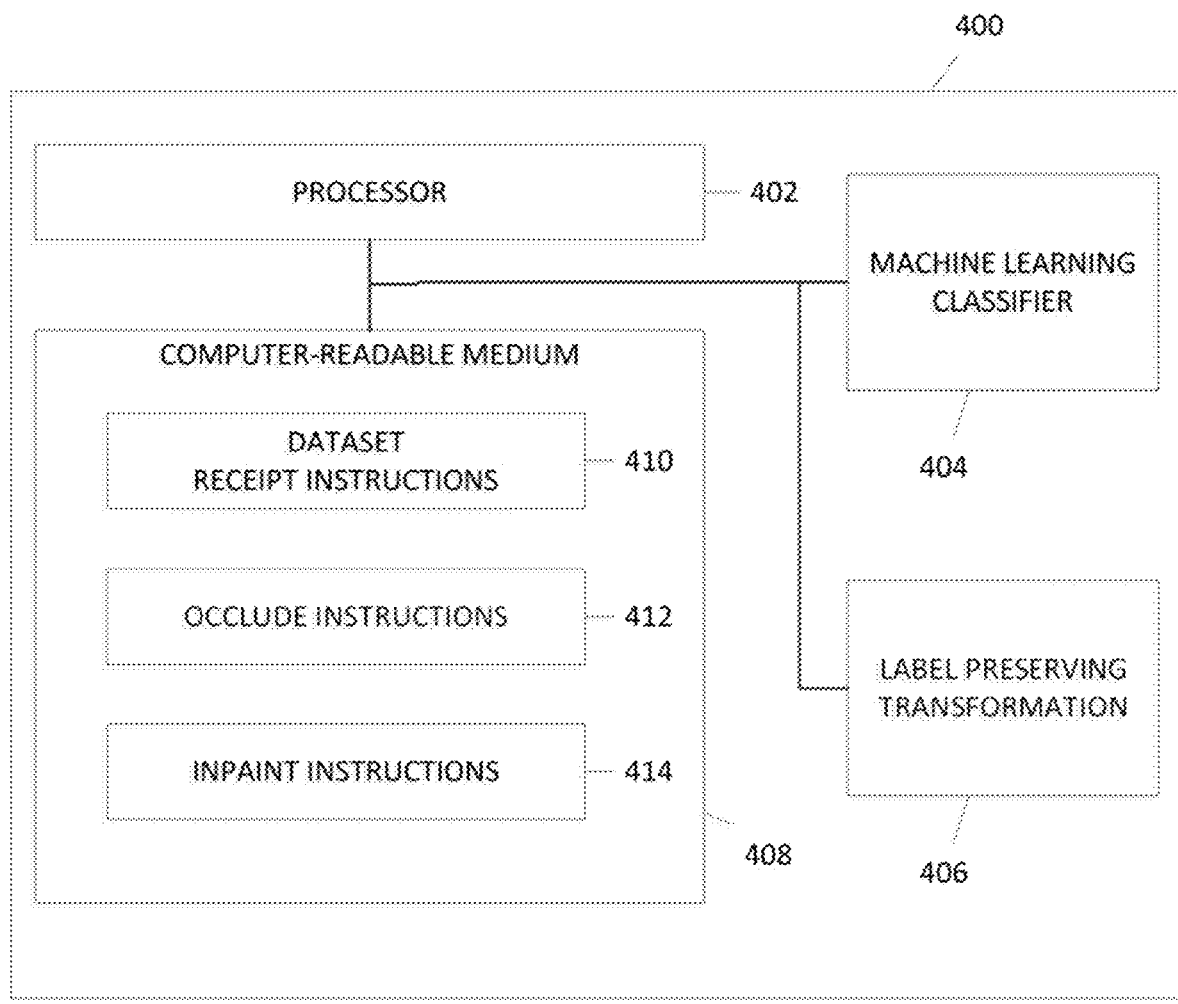
FIG. 4 is a block diagram illustrating one example of a computer readable medium for dataset augmentation based on occlusion and inpainting.

FIG. 4 is a block diagram illustrating one example of a computer readable medium for dataset augmentation based on occlusion and inpainting. Processing system 400 includes a processor 402, a computer readable medium 408, a machine language classifier 404, and a label preserving transformation 406. In one example, the label preserving transformation 406 includes occlusion and inpainting. Processor 402, computer readable medium 408, the machine language classifier 404, and the label preserving transformation 406 are coupled to each other through communication link (e.g., a bus).

Processor 402 executes instructions included in the computer readable medium 408. Computer readable medium 408 includes dataset receipt instructions 410 to receive training dataset for machine learning, the dataset including at least one training data. Computer readable medium 408 includes occlude instructions 412 of the label preserving transformation 406 to occlude a selected portion of the at least one training data.

Computer readable medium 408 includes inpaint instructions 414 of the label preserving transformation 406 to inpaint the occluded portion of the at least one training data, where the inpainting is based on data from a portion different from the occluded portion.

In one example, the dataset is a dataset of images, and the at least one training data is an image, and the selected portion of the image is a plurality of pixels in the image. Computer readable medium 408 includes occlude instructions 412 of the label preserving transformation 406 to occlude randomly selected plurality of pixels. Randomness ensures that the occlude instructions 412 result in a selection of distinct portions in each of N copies, thereby generating N distinct copies of the at least one training data. Computer readable medium 408 includes inpaint instructions 414 of the label preserving transformation 406 to inpaint the occluded plurality of pixels by digitally inpainting the plurality of pixels based on information from the pixels that are different from the occluded plurality of pixels. In one example, the occlude instructions 412 and the inpaint instructions 414 of the label preserving transformation 406 may be applied repeatedly N times on the at least one training data. This generates N transformed training data for each of M training data, thereby producing M*N transformed training data.

Computer readable medium 408 includes instructions to augment the dataset by adding, for the at least one training data, the transformed at least one training data to the dataset. In one example, computer readable medium 408 includes deploy instructions to deploy the augmented dataset to train a machine learning classifier. In one example, computer readable medium 408 includes deploy instructions to infer, based on the trained machine learning classifier, a label for unlabeled data. In one example, the machine learning classifier is a deep learning classifier.

Figure 5:
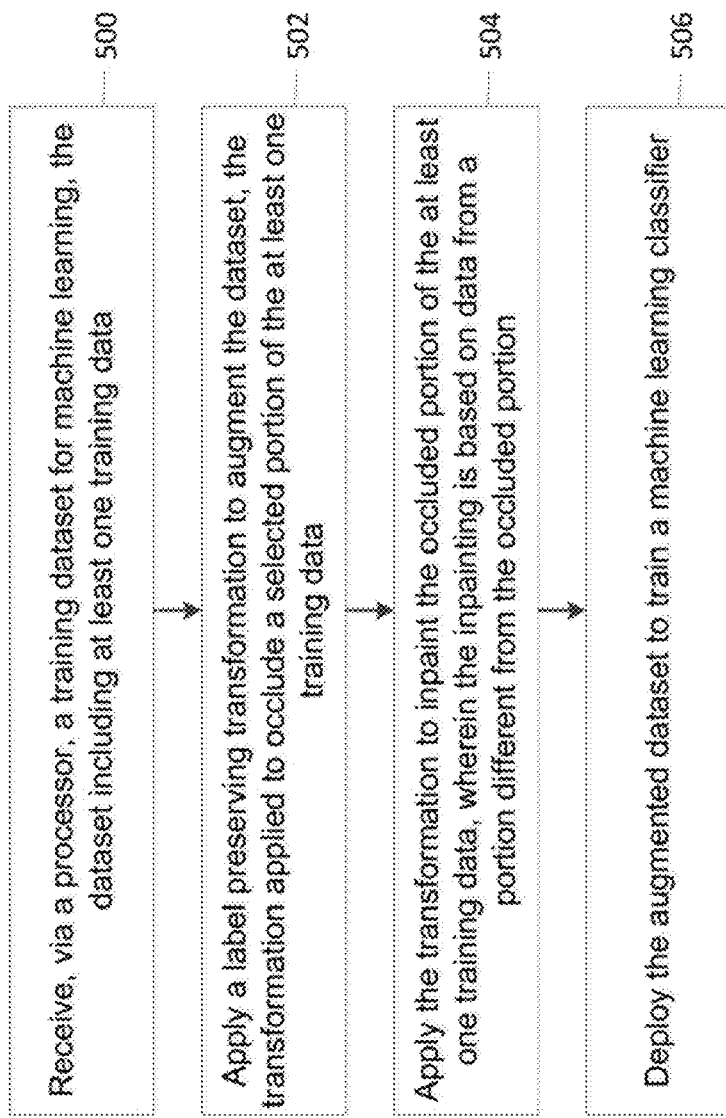
FIG. 5 is a flow diagram illustrating one example of a method for dataset augmentation based on occlusion and inpainting.

FIG. 5 is a flow diagram illustrating one example of a method for dataset augmentation based on occlusion and inpainting. At 500, a training dataset for machine learning is received, the dataset including at least one training data. At 502, a label preserving transformation is applied to augment the dataset, the transformation applied to occlude a selected portion of the at least one training data. At 504, the transformation is applied to inpaint the occluded portion of the at least one training data, where the inpainting is based on data from a portion different from the occluded portion. At 506, the augmented dataset is deployed to train a machine learning classifier.

In one example, the machine learning classifier is a deep learning classifier.

In one example, the dataset is a dataset of images, and the at least one training data is an image, and the selected portion of the image is a plurality of pixels in the image. In one example, another image may be received for image processing. At least one occlusion may be identified in the another image based on the trained machine learning classifier. The at least one occlusion may be inpainted based on the trained machine learning classifier.

In one example, the portion of the at least one training data is selected randomly. Randomness ensures that the occlusion selects distinct portions in each of N copies of the at least one training data, thereby generating N distinct copies of the at least one training data. In one example, the occlusion and inpainting may be repeated N times on the at least one training data. This generates N transformed training data for each of M training data, thereby producing M*N transformed training data.

In one example, the label of the at least one transformed training data may be modified based on the occluding and the inpainting.

Examples of the disclosure provide a generalized system for dataset augmentation based on occlusion and inpainting. The generalized system augments an existing state-of-the-art object classification algorithm by utilizing new label preserving transformations to generate new training data from existing training data in the dataset. Examples of the disclosure also provide applications of such an augmented dataset to object recognition analyses.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A system comprising:
a processor; and
a non-transitory storage medium storing instructions executable on the processor to:
generate an augmented training dataset from a first training dataset including a first plurality of training data objects, by generating additional training data objects for the augmented dataset using the plurality of training data objects of the first training dataset and associating a second plurality of training data objects with the augmented training dataset, the second plurality of training data objects including the additional training data objects and the first plurality of training data objects,
    wherein the generating the additional training data objects comprises applying a label preserving transformation to a training data object of the first training dataset, the label preserving transformation comprising:
        randomly selecting different portions of the training data object of the first training dataset, wherein the random selection of the different portions ensures that the different portions are distinct portions of the training data object,
        occluding the randomly selected different portions of the training data object, and
        inpainting the occluded portions of the training data object to form inpainted occluded portions, wherein the inpainting of each respective occluded portion of the occluded portions comprises replacing data from the respective occluded portion with data from a portion of the training data object different from the respective occluded portion; and
    train a machine learning classifier using the augmented training dataset comprising the first plurality of training data objects of the first training dataset and the additional training objects.

2. The system of claim 1, wherein the trained machine learning classifier infers a label for unlabeled data.

3. The system of claim 1, wherein the machine learning classifier is a deep learning classifier.

4. The system of claim 1, wherein the instructions are executable on the processor to apply the label preserving transformation to each of the first plurality of training data objects to produce an increased number of training data objects for training the machine learning classifier.

5. The system of claim 1, wherein the occluding is performed on N different portions of the training data object, and the inpainting is performed on each of the N occluded portions of the training data object to provide N distinct copies of the training data object, the instructions executable on the processor to assign a same label to the N distinct copies of the training data object, wherein N is greater than one, the N distinct copies of the training data object and the assigned same label being part of the augmented training dataset for training the machine learning classifier.

6. The system of claim 1, wherein the inpainting of the occluded portions comprises digitally inpainting pixels of each respective occluded portion of the occluded portions using information of pixels of another portion of the training data object.

7. The system of claim 1, wherein the inpainting of each respective occluded portion of the occluded portions further comprises:
    erasing at least one of the occluded portions; and
    filing pixels of the at least one of the occluded portions with information not in the occluded portions and that are visible in the training data object.

8. The system of claim 1, wherein the data from the portion of the training data object different from the respective occluded portion includes at least one of an occlusion type blob and an occlusion type bar.

9. The system of claim 1, wherein the processor is further configured to:
    generate metadata that includes a location or type of each of the occluded portions of the training data object.

10. A method comprising:
    receiving, by a system comprising a processor, a first training dataset for machine learning, the first training dataset including a first plurality of training data objects;
    generating, by the system, an augmented training dataset including a second plurality of training data objects by generating additional training data objects for the augmented training dataset and associating a second plurality of training data objects with the augmented training dataset, the second plurality of training data objects including the additional training data objects and the first plurality of training data objects,
        wherein the generating the additional training data objects comprises applying a label preserving transformation to a training data object of the first training dataset, the label preserving transformation comprising:
            randomly selecting different portions of the training data object of the first training dataset, wherein the random selection of the different portions ensures that the different portions are distinct portions of the training data object,
            occluding the randomly selected different portions of the training data object, and
            inpainting the occluded portions of the training data object to form inpainted occluded portions, wherein the inpainting of each respective occluded portion of the occluded portions comprises replacing data from the respective occluded portion with data from a portion of the training data object different from the respective occluded portion; and
    training a machine learning classifier using the augmented training dataset comprising the first plurality of training data objects of the first training dataset and the additional training data objects.

11. The method of claim 10, wherein the machine learning classifier is a deep learning classifier.

12. The method of claim 10, wherein the label preserving transformation is applied to each of the first plurality of training data objects to produce an increased number of training data objects for training the machine learning classifier.

13. The method of claim 10, wherein the occluding is performed on N different portions of the training data object, and the inpainting is performed on each of the N occluded portions of the training data object to provide N distinct copies of the training data object, the method further comprising:
    assigning, by the system, a same label to the N distinct copies of the training data object, wherein N is greater than one, the N distinct copies of the training data object and the assigned same label being part of the augmented training dataset for training the machine learning classifier.

14. The method of claim 10, wherein the inpainting of the occluded portions comprises digitally inpainting pixels of each respective occluded portion of the occluded portions using information of pixels of another portion of the training data object.

15. The method of claim 10, further comprising executing the trained machine learning classifier to assign a label to unlabeled data.

16. A non-transitory computer readable medium comprising executable instructions that upon execution cause a system to:

receive a first training dataset for machine learning, the first training dataset including a first plurality of training data objects; and generate an augmented training dataset including a second plurality of training data objects by generating additional training data objects for the augmented training dataset and associating a second plurality of training data objects with the augmented training dataset, the second plurality of training data objects including the additional training data objects and the first plurality of training data objects, wherein the generating the additional training data objects comprises applying a label preserving transformation to a training data object of the first training dataset, the label preserving transformation comprising:

randomly selecting different portions of the training data object of the first training dataset, wherein the random selection of the different portions ensures that the different portions generated by the label preserving transformation are distinct portions of the training data object, occluding the randomly selected different portions of the training data object, and inpainting the occluded portions of the training data object to form inpainted occluded portions, wherein the inpainting of each respective occluded portion of the occluded portions comprises filling the respective occluded portion with data from a portion of the training data object different from the respective occluded portion; and train a machine learning classifier using the augmented training dataset comprising the first plurality of training data objects of the first training dataset and the additional training data objects.

17. The non-transitory computer readable medium of claim 16, wherein the label preserving transformation is applied to each of the data objects to produce an increased number of training data objects for training the machine learning classifier.

18. The non-transitory computer readable medium of claim 16, wherein the inpainting of the occluded portions comprises digitally inpainting pixels of each respective occluded portion of the occluded portions using information of pixels of another portion of the training data object.

19. The non-transitory computer readable medium of claim 16, wherein the instructions upon execution cause the system to further:

execute the trained machine learning classifier to assign a label to unlabeled data.

20. The non-transitory computer readable medium of claim 16, wherein the occluding of the different portions of the training data object comprises adding obstructions to the different portions of the training data object.

* * * * *